US011931867B2

(12) United States Patent
Chang et al.

(10) Patent No.: US 11,931,867 B2
(45) Date of Patent: Mar. 19, 2024

(54) SOCKET USED IN COORDINATION WITH WRENCH

(71) Applicant: Yu-Ching Chen, Changhua County (TW)

(72) Inventors: Chih-Min Chang, Changhua County (TW); Chia-Hui Peng, Taichung (TW)

(73) Assignee: Yu-Ching Chen, Changhua County (TW)

( * ) Notice: Subject to any disclaimer, the term of this patent is extended or adjusted under 35 U.S.C. 154(b) by 31 days.

(21) Appl. No.: 16/711,949

(22) Filed: Dec. 12, 2019

(65) Prior Publication Data

US 2021/0008693 A1 Jan. 14, 2021

(30) Foreign Application Priority Data

Jul. 8, 2019 (TW) ................................ 108123987

(51) Int. Cl.
*B25B 13/06* (2006.01)
*B25B 23/00* (2006.01)

(52) U.S. Cl.
CPC .......... *B25B 13/06* (2013.01); *B25B 23/0035* (2013.01)

(58) Field of Classification Search
CPC ......... B25B 13/06; B25B 13/58; B25B 13/00; B25B 13/481; B25B 23/1427; B60C 25/01
USPC ........................................................ 81/121.1
See application file for complete search history.

(56) References Cited

U.S. PATENT DOCUMENTS 4,825,732 A * 5/1989 Arnold .................... B25B 13/06
81/121.1
4,947,713 A * 8/1990 Arnold .................... B25B 13/06
81/121.1
4,979,355 A * 12/1990 Ulevich .................. B25B 13/06
81/121.1
5,009,133 A * 4/1991 Carey ..................... B25B 13/06
81/121.1

(Continued)

FOREIGN PATENT DOCUMENTS

CN 201195296 Y * 2/2009
TW I618604 B * 3/2018 ............ B25B 13/06

OTHER PUBLICATIONS http://web.archive.org/web/20170711165505/http://www.gorilla-auto.com/thin-wall-sockets (Year: 2017).*

*Primary Examiner* — Don M Anderson
*Assistant Examiner* — Jason Khalil Hawkins
(74) *Attorney, Agent, or Firm* — Muncy, Geissler, Olds & Lowe, P.C.

(57) ABSTRACT

The present invention relates to a socket used in coordination with a wrench. The socket includes a socket main body which has a head portion and a body portion connected to the head portion. The head portion is adapted for being coupled with the wrench. The body portion has a polygonal hole for being coupled with a head portion of a bolt or a nut, so that the wrench is adapted for screwing on or off the bolt or nut through the socket main body. Besides, a pipe made of composite material is sleeved onto the external peripheral surface of the body portion. The pipe is freely detachable, and the external peripheral surface of the pipe can be provided with a print, pattern, color or character according to the practical demands, thereby attaining the effects of high variability in appearance, great durability and great recognizability.

6 Claims, 8 Drawing Sheets

(56) References Cited

U.S. PATENT DOCUMENTS

| | | | | | |
|---|---|---|---|---|---|
| 5,970,826 | A * | 10/1999 | Iwinski | B29C 45/14467 81/124.6 |
| 7,036,401 | B2 * | 5/2006 | Carroll | B25B 13/06 81/124.4 |
| 7,627,968 | B2 * | 12/2009 | Lin | B25B 13/06 40/306 |
| 7,987,748 | B2 * | 8/2011 | Chiu | B25G 1/00 81/121.1 |
| 8,359,953 | B2 * | 1/2013 | Lin | B25B 13/06 81/184 |
| 8,869,659 | B2 * | 10/2014 | Chang | B25G 1/00 81/177.85 |
| 8,950,297 | B2 * | 2/2015 | Sumg | B25B 13/06 81/121.1 |
| 9,027,445 | B2 * | 5/2015 | Sumg | B25B 13/58 81/121.1 |
| 9,975,232 | B2 * | 5/2018 | Neitzell | B25B 31/00 |
| 2003/0066395 | A1 * | 4/2003 | Lin | B25B 23/00 81/177.2 |
| 2003/0192409 | A1 * | 10/2003 | Wallace | B25B 13/06 81/121.1 |
| 2014/0053692 | A1 * | 2/2014 | Hu | B25B 13/06 81/121.1 |

* cited by examiner

SOCKET USED IN COORDINATION WITH WRENCH

BACKGROUND OF THE INVENTION

1. Field of the Invention

The present invention relates to wrenches and more particularly, to a socket used in coordination with a wrench.

2. Description of the Related Art

Bolts and nuts are common and widely used fixing elements in daily life. Wrenches are tools used for screwing on or off the bolts and nuts, which can be driven electrically or pneumatically. The socket wrench is one kind of the wrenches for rotating the nut or bolt through a socket sleeved onto the nut or a head portion of the bolt.

In the tool box the user usually prepares sockets of different sizes for matching the bolts and nuts of different sizes, so that the user can select the appropriate socket according to the usage requirement. However, in appearance the large number of sockets are only a little different in size but lack of recognizability in other aspects, so the user is liable to take the socket of wrong size. Therefore, some sockets are printed on the surface thereof with size marks to increase the recognizability, but such manner is too expensive in cost and actually achieves quite limited recognition effect, thereby difficult to be widely applied.

SUMMARY OF THE INVENTION

It is a primary objective of the present invention to provide a socket used in coordination with a wrench, which is manufactured conveniently, highly variable in appearance, great in durability and relatively better in recognizability.

To attain the above objective, the present invention provides a socket which includes a socket main body and a pipe. The socket main body has a head portion and a body portion. The head portion is adapted for being coupled with a wrench. An end of the body portion is connected to the head portion, and the body portion has a polygonal hole for being coupled with a head portion of a bolt or a nut. The pipe is made of composite material and detachably sleeved onto the body portion of the socket main body.

Because of being made of composite material, the pipe has the features of convenient manufacture, light weight and high strength, and can be easily provided on the surface thereof with various designs of print, pattern, color or character for being recognized by the user. In other words, the socket of the present invention has the effects of high variability in appearance, great durability and relatively better recognizability.

Preferably, the external radius of the head portion is larger than the external radius of the body portion, so that a shoulder surface is formed at the juncture of the head portion and the body portion; the pipe is positioned in a way that an end thereof is abutted against the shoulder surface.

Preferably, the shoulder surface has an embedding groove; the end of the pipe has an embedding portion embedded in the embedding groove, so that the effect of the pipe being positioned is further improved.

Preferably, the external peripheral surface of the body portion has a plurality of protruding lines arranged abreast of each other; the plurality of protruding lines are located adjacent to the shoulder surface and abutted against the internal peripheral surface of the pipe, so that the effect of the pipe being positioned is further improved.

Preferably, the external peripheral surface of the pipe may be flush in elevation with the external peripheral surface of the head portion, or a difference in elevation may be provided between the external peripheral surface of the pipe and the external peripheral surface of the head portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
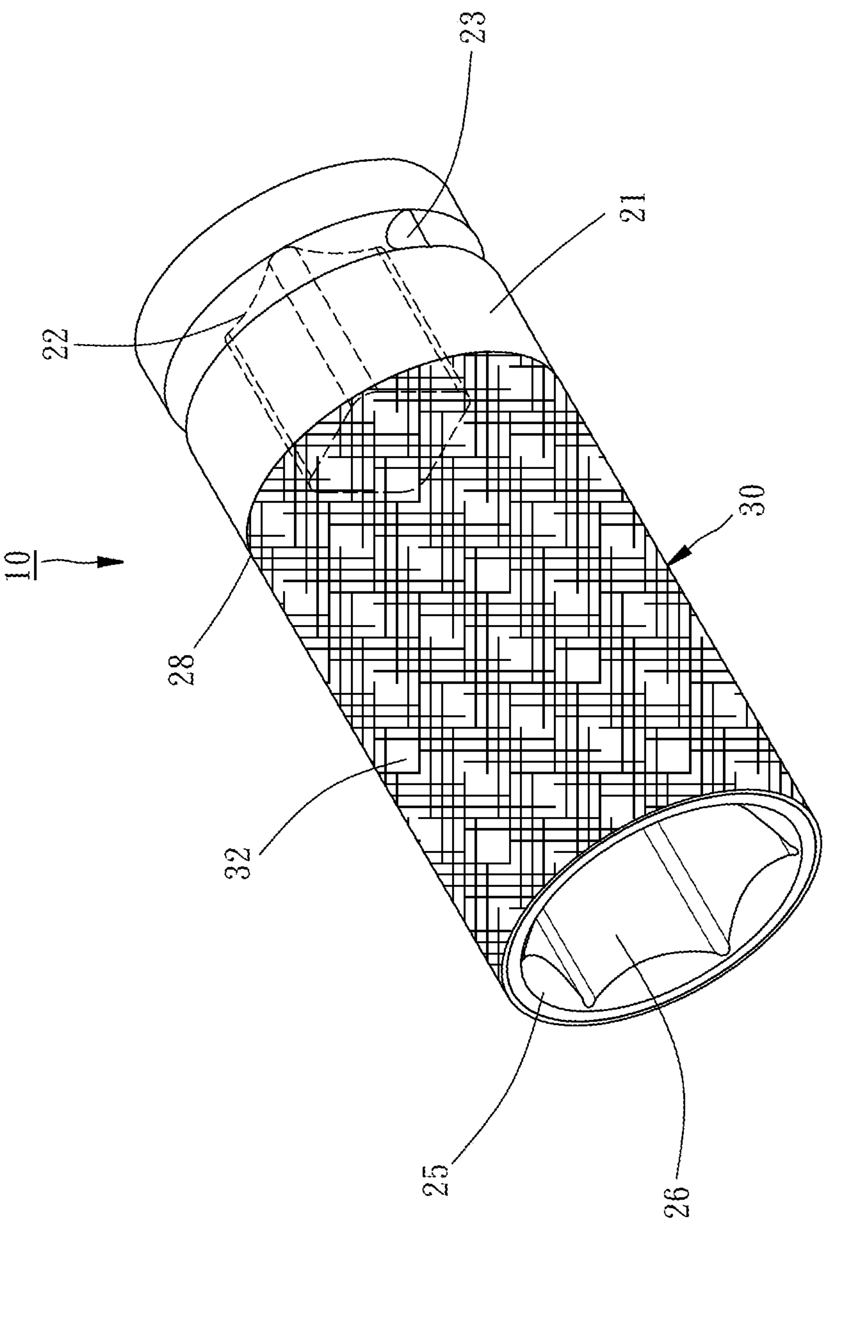
FIG. 1 is a perspective view of a socket of a first embodiment of the present invention.

First of all, it is to be mentioned that throughout the specification, including the following embodiments and the claims, the directionality-related nouns are all based on the direction in the figures. Besides, same reference numerals used in the following embodiments and the figures designate same or similar elements or the structural features thereof.

Figure 2:
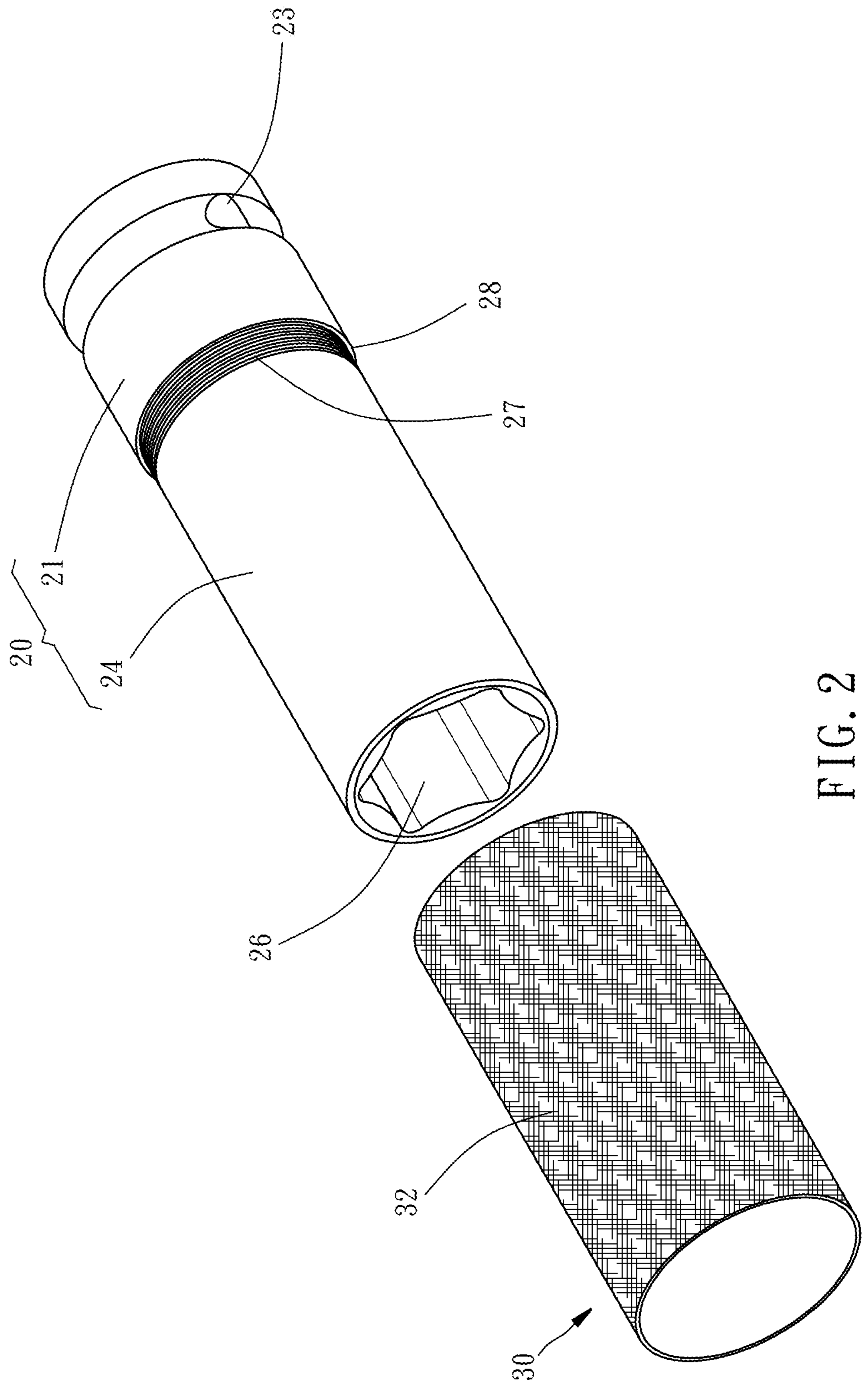
FIG. 2 is an exploded perspective view of the socket of the first embodiment of the present invention.

Referring to FIG. 1 and FIG. 2, a socket 10 of a first embodiment of the present invention includes a socket main body 20 and a pipe 30.

The socket main body 20 is made of metal. The socket main body 20 has a head portion 21 and a body portion 24. An end of the body portion 24 is connected to the head portion 21. The other end of the body portion 24 is a free end 25. The external radius of the head portion 21 is larger than the external radius of the body portion 24, so that a shoulder surface 28 is formed at the juncture of the head portion 21 and the body portion 24. Besides, the head portion 21 has a transmission hole 22 for being combined with a wrench, and a pair of through holes 23 radially communicating with the transmission hole 22. The body portion 24 has a polygonal hole 26 for being combined with a head portion of a bolt or a nut. For example, the polygonal hole 26 is a hexagonal hole in this embodiment. As shown in FIG. 2, in this embodiment, the external peripheral surface of the body portion 24 has a plurality of protruding lines 27 located adjacent to the shoulder surface. These protruding lines 27 are arranged abreast of each other. In this way, the wrench is adapted for screwing on or off the bolt or nut through the socket main body 20.

Figure 3:
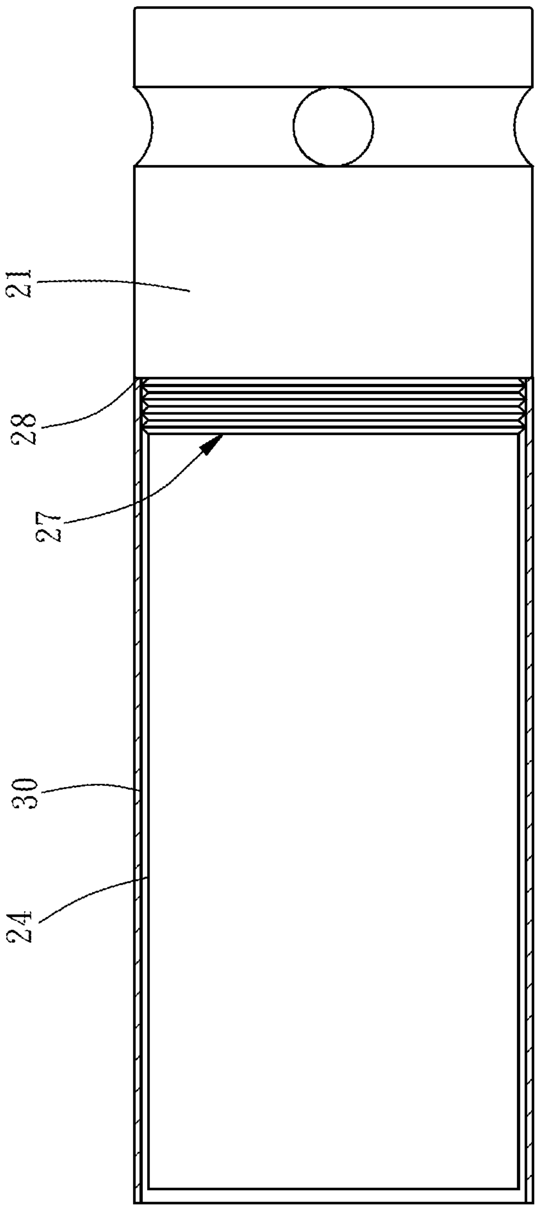
FIG. 3 is a partially sectional view of the socket of the first embodiment of the present invention.

The pipe 30 is made of composite material such as carbon fiber or glass fiber. The pipe 30 is sleeved onto the body portion 24 of the socket main body 20. The length of the pipe 30 is a little larger than the length of the body portion 24. An end of the pipe 30 is abutted against the shoulder surface 28. The other end of the pipe 30 protrudes beyond the free end 25 of the body portion 24, as shown in FIG. 1. Besides, the pipe 30 is positioned in a way that the internal peripheral surface thereof is abutted against the protruding lines 27 of the body portion 24, as shown in FIG. 3. The external peripheral surface of the pipe 30 has a recognition layer 32 which may include a print, a pattern, a color, a character or a set of anyone mentioned above according to the practical demands.

Figure 4:
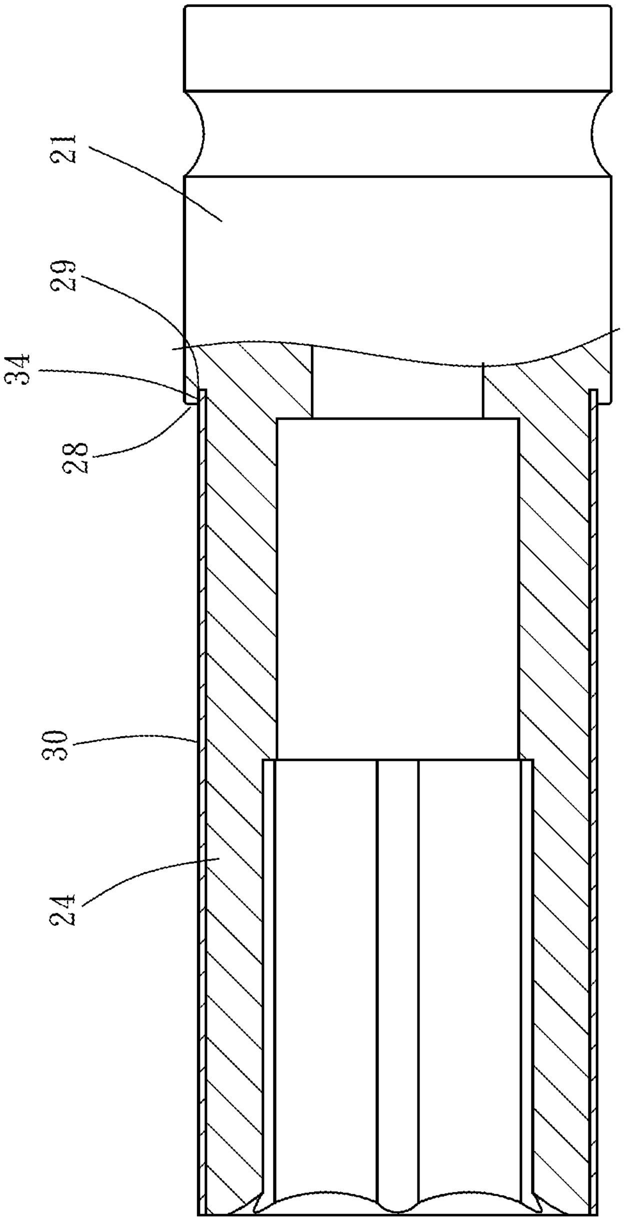
FIG. 4 is a partially sectional view of a socket of a second embodiment of the present invention.
Figure 5:
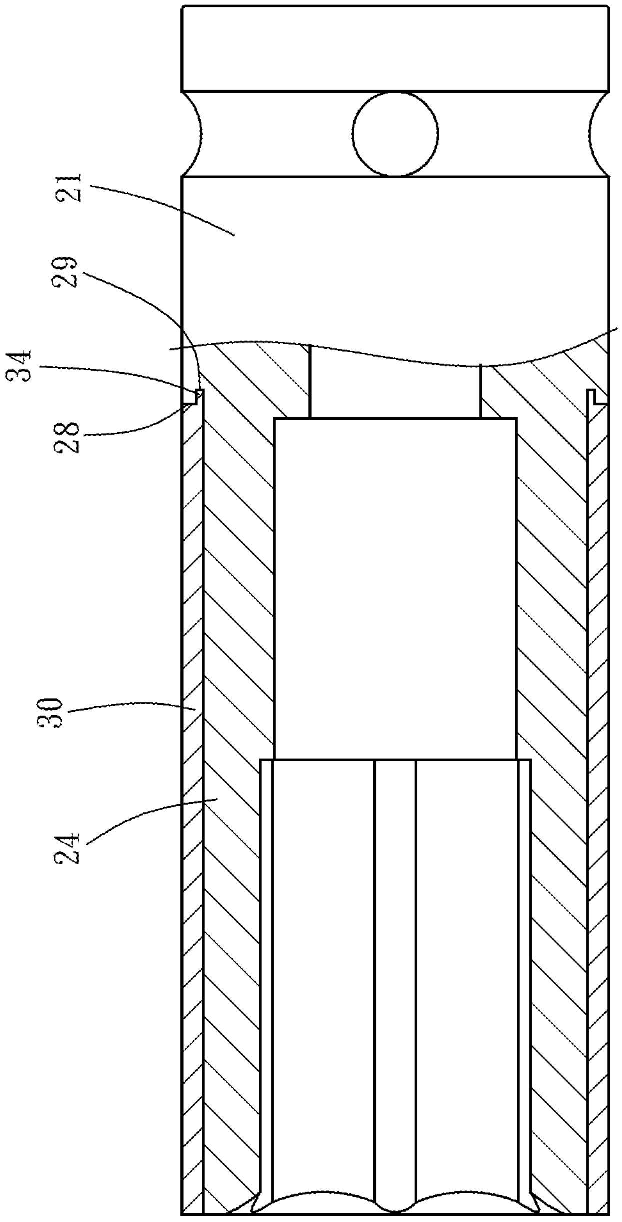
FIG. 5 is a partially sectional view of a socket of a third embodiment of the present invention.
Figure 6:
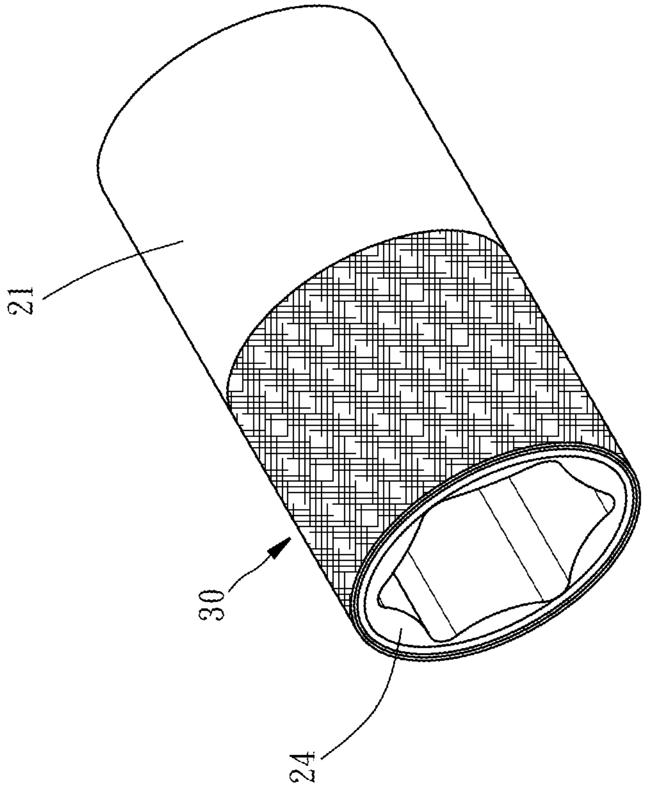
FIG. 6 is a perspective view of a socket of a fourth embodiment of the present invention.

However, the manner of positioning the pipe 30 on the socket main body 20 has some modifications. Referring to FIG. 4, in a second embodiment of the present invention, the body portion 24 is provided without such protruding line, but with an embedding groove 29 on the shoulder surface 28. An end of the pipe 30 has a protruding embedding portion 34. After the pipe 30 is sleeved onto the body portion 24, it is positioned in a way that the embedding portion 34 is embedded in the embedding groove 29 of the shoulder surface 28. Besides, in this embodiment, a difference in elevation is provided between the external peripheral surface of the pipe 30 and the external peripheral surface of the head portion 21 in a way that the external radius of the pipe 30 is smaller than the external radius of the head portion 21. Referring to FIG. 5, in a third embodiment of the present invention, the pipe 30 is also positioned in a way that the embedding portion 34 is embedded in the embedding groove 29 of the shoulder surface 28, which is different from the aforesaid second embodiment in that the pipe 30 in the third embodiment is thicker. Therefore, after the pipe 30 is sleeved onto the body portion 24, the external peripheral surface of the pipe 30 is flush in elevation with the external peripheral surface of the head portion. 21, so that the appearance of the whole structure has great completeness. Referring to FIG. 6, the head portion 21 in FIG. 6 has no such through hole, thereby relatively fuller in appearance. Besides, the body portion 24 and the pipe 30 become relatively shorter in length for the adaption to different usage requirements.

Figure 7:
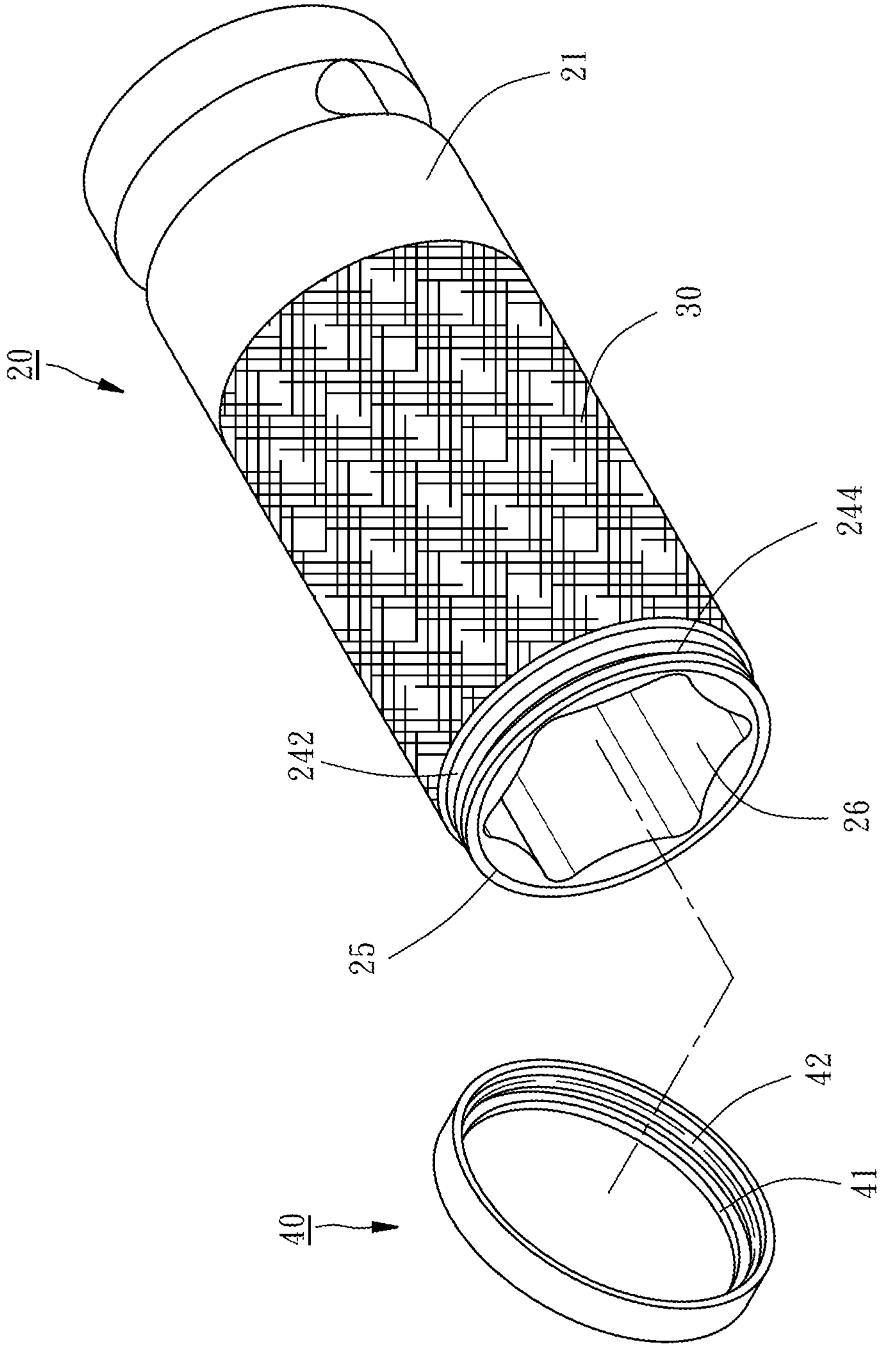
FIG. 7 is an exploded perspective view of a socket of a fifth embodiment of the present invention.
Figure 8:
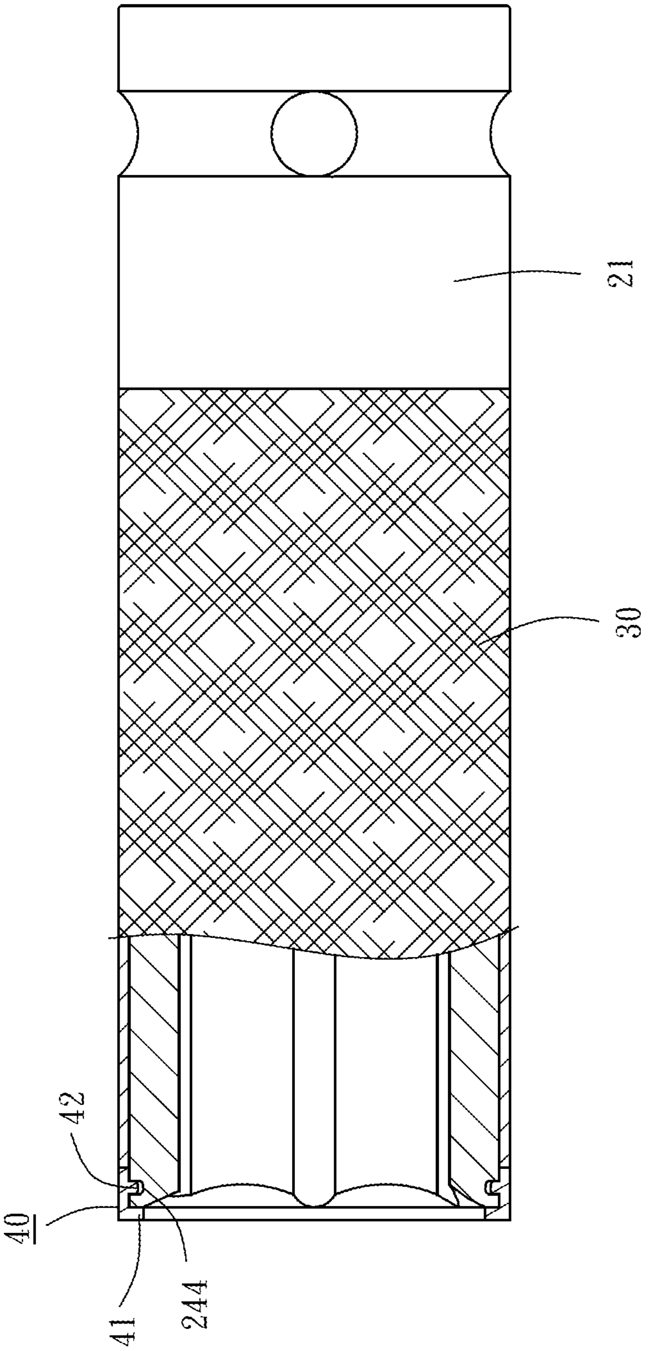
FIG. 8 is a partially sectional view of the socket of the fifth embodiment of the present invention.

FIG. 7 and FIG. 8 show a fifth embodiment of the present invention. In this embodiment, the body portion 24 of the socket main body 20 is provided with an extending section 242 between the free end 25 and the pipe 30. The extending section 242 is provided with an annular groove 244. An end cap 40 made of nonmetal and shaped as a circular ring is provided, an end of which can be sleeved onto the extending section 242 of the body portion 24. The other end of the end cap 40 is provided with an annular fence 41 extending radially. The inner surface of the end cap 40 is provided annularly at the middle thereof with a protruding fence 42. When the end cap 40 is sleeved onto the extending section 242 of the body portion 24, the protruding fence 42 is just embedded in the annular groove 244 of the extending section 242, so that the end cap 40 and the body portion 24 of the socket main body 20 are combined together. When the socket 10 of the present invention is applied in the tools for the replacement of the automobile aluminum alloy rim, such design can prevent the free end 25 of the fast-rotating socket 10 from directly contacting and damaging the surface of the aluminum alloy rim, thereby protective towards the surface coating layer of the automobile aluminum alloy rim.

In conclusion, the pipe made of composite material has the features of convenient manufacture, light weight and high strength, and can be easily provided on the external peripheral surface thereof with various designs of print, pattern, color or character for being recognized by the user. In other words, the socket 10 of the present invention can certainly attain the effects of high variability in appearance, great durability and relatively better recognizability.

What is claimed is:

1. A socket, which is used in coordination with a wrench, the socket comprising:

a socket main body having a head portion and a body portion, an end of the body portion being connected to the head portion, the body portion having a polygonal hole; and a pipe made of composite material and detachably sleeved onto the body portion of the socket main body;

wherein an external radius of the head portion is larger than an external radius of the body portion, so that a shoulder surface is formed at a juncture of the head portion and the body portion;

a first end of the pipe is abutted against the shoulder surface;

wherein a second end of the pipe is protruded beyond a free end of the body portion to protect the free end of the body portion;

wherein an external peripheral surface of the body portion has a plurality of protruding lines arranged abreast of each other; the plurality of protruding lines are located adjacent to the shoulder surface and abutted against an internal peripheral surface of the pipe;

wherein the plurality of protruding lines protrude out of the external peripheral surface of the body portion;

wherein the composite material is carbon fiber or glass fiber;

wherein along a direction defined from the head portion to a distal end of the body portion, the protruding lines overall have a first length along the direction, and the external peripheral surface of the body portion overall has a second length along the direction; the first length is smaller than the second length wherein the external peripheral surface of the body portion is not located between the protruding lines.

2. The socket as claimed in claim 1, wherein an external peripheral surface of the pipe has a recognition layer which comprises one of a print, a pattern, a color, a character and a set of any one mentioned above.

3. The socket as claimed in claim 1, wherein an external peripheral surface of the pipe is flush in elevation with an external peripheral surface of the head portion.

4. The socket as claimed in claim 3, wherein an external peripheral surface of the pipe has a recognition layer which comprises one of a print, a pattern, a color, a character and a set of any one mentioned above.

5. The socket as claimed in claim 1, wherein a difference in elevation is provided between an external peripheral surface of the pipe and an external peripheral surface of the head portion.

6. The socket as claimed in claim 1, wherein an opposing end of the body portion of the socket main body, which is located opposite to the head portion, is provided on an external peripheral surface thereof with an annular groove; an end cap made of nonmetal and shaped as a circular ring is provided on an end thereof with an annular fence extending radially; another end of the end cap is provided on an inner surface thereof with a protruding fence; the end cap and the body portion of the socket main body are combined in a way that the protruding fence is embedded in the annular groove of the body portion.

* * * * *